(12) United States Patent
Zheng et al.

(10) Patent No.: US 11,500,370 B2
(45) Date of Patent: Nov. 15, 2022

(54) SYSTEM FOR PREDICTIVE MAINTENANCE USING GENERATIVE ADVERSARIAL NETWORKS FOR FAILURE PREDICTION

(71) Applicant: Hitachi, Ltd., Tokyo (JP)

(72) Inventors: Shuai Zheng, San Jose, CA (US); Ahmed Khairy Farahat, Santa Clara, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 653 days.

(21) Appl. No.: 16/547,374

(22) Filed: Aug. 21, 2019

(65) Prior Publication Data

US 2021/0055719 A1 Feb. 25, 2021

(51) Int. Cl.
  *G05B 23/02* (2006.01)
  *G06K 9/62* (2022.01)
  *G06N 3/08* (2006.01)

(52) U.S. Cl.
  CPC ..... *G05B 23/0283* (2013.01); *G05B 23/0275* (2013.01); *G06K 9/6259* (2013.01); *G06N 3/08* (2013.01)

(58) Field of Classification Search
  CPC ............ G05B 23/0283; G05B 23/0275; G06K 9/6259; G06K 9/6271; G06N 3/08; G06N 3/0454; G06N 3/0472; G06V 10/82
  See application file for complete search history.

(56) References Cited

U.S. PATENT DOCUMENTS

| | | | |
|---|---|---|---|
| 11,010,637 B2* | 5/2021 | Visentini Scarzanella | G06V 10/82 |
| 2013/0080117 A1* | 3/2013 | Liu | G06F 17/10 702/183 |
| 2020/0074303 A1* | 3/2020 | Ch | G06N 3/0454 |
| 2020/0151508 A1* | 5/2020 | Yang | G06V 30/19147 |
| 2020/0218937 A1* | 7/2020 | Visentini Scarzanella | G06N 3/0454 |
| 2020/0250304 A1* | 8/2020 | Kruus | G06N 3/08 |
| 2020/0386978 A1* | 12/2020 | Lee | G02B 21/365 |
| 2020/0405242 A1* | 12/2020 | Kearney | A61B 6/032 |
| 2022/0076066 A1* | 3/2022 | Forgeat | G06K 9/6263 |

OTHER PUBLICATIONS

Chawla, N. et al. "SMOTE: Synthetic Minority Over-sampling Technique" Journal of Artificial Intelligence Research, Jun. 2002, pp. 321-357, vol. 16 (37 pages).

He, H. et al. "ADASYN: Adaptive Synthetic Sampling Approach for Imbalanced Learning" 2008 International Joint Conference on Neural Networks (IJCNN 2008), pp. 1322-1328 (7 pages).

(Continued)

*Primary Examiner* — Mohammad K Islam
(74) *Attorney, Agent, or Firm* — Procopio, Cory, Hargreaves & Savitch LLP (57) ABSTRACT

Example implementations involve a system for Predictive Maintenance using Generative Adversarial Networks for Failure Prediction. Through utilizing three processes concurrently and training them iteratively with data-label pairs, example implementations described herein can thereby generate a more accurate predictive maintenance model than that of the related art. Example implementations further involve shared networks so that the three processes can be trained concurrently while sharing parameters with each other.

14 Claims, 7 Drawing Sheets

(56) References Cited

OTHER PUBLICATIONS

Chen, X. et al. "InfoGAN: Interpretable Representation Learning by Information Maximizing Generative Adversarial Nets" 30th Conference on Neural Information Processing Systems (NIPS 2016), Barcelona, Spain., pp. 2172-2180 (9 pages).
Goodfellow, I. et al. "Generative Adversarial Nets" In Advances in Neural Information Processing Systems, 2014 (9 pages).
Mirza, M. et al. "Conditional Generative Adversarial Nets" arXiv preprint arXiv:1411.1784, 2014 (7 pages).

\* cited by examiner

| Apparatus | Type | Sensor Data | Labels |
|---|---|---|---|
| A1 | Equip1 | Data1 | Label1 |
| A2 | Equip1 | Data2 | Label2 |
| A3 | Equip2 | Data3 | Label3 |
| ... | ... | ... | ... |

SYSTEM FOR PREDICTIVE MAINTENANCE USING GENERATIVE ADVERSARIAL NETWORKS FOR FAILURE PREDICTION

BACKGROUND

Field

The present disclosure is generally directed to maintenance systems, and more specifically, to improving failure prediction based on generative adversarial networks (GANs).

Related Art

Maintenance is a process whose objective is to keep the equipment in a working, efficient and cost-effective condition. The maintenance process is conducted by performing the necessary actions on the equipment in order to achieve one or more of these objectives. These actions include, but not limited to, the inspection, tuning, repair and overhaul of the equipment or its components. Maintenance actions are typically conducted according to one or more of the following strategies:

Corrective maintenance: Corrective maintenance takes corrective actions after the equipment or one of its components fails in order to retain its working status. As this strategy waits for the equipment to fail before taking a maintenance action, this results in decreasing the availability of the equipment. In addition, it is usually more expensive and time-consuming to perform the corrective actions after the equipment failure.

Preventive maintenance (also known as, time-based maintenance): Preventive maintenance performs maintenance actions on a regular basis regardless of the condition of the equipment. This is the most commonly followed strategy for equipment maintenance. Preventive maintenance avoids the limitations of corrective maintenance by performing periodic maintenance actions (e.g., periodic replacement of parts). However, this strategy is typically very expensive as most of the periodic maintenance actions are done while the equipment is in a good condition, and they could have been avoided if the actual condition of the equipment is known while planning for maintenance. Moreover, between two maintenance actions, the equipment is still prone to unexpected failures that might happen due to abnormal usage patterns or environmental conditions.

Predictive maintenance (also known as, condition-based maintenance): Predictive maintenance continually monitors the condition of the equipment to determine the right maintenance actions need to be taken at the right times. Predictive maintenance approaches mainly depend on encoding information about pre-failure conditions of the equipment and then monitoring real-time sensor and event data searching for these conditions. Predictive maintenance reduces the chance of unexpected failures, increases the equipment availability, and accordingly decreases the overall cost of the maintenance process.

One of the main objectives of predictive maintenance is to prevent failures before they happen. This is typically done by monitoring the equipment and searching for any pre-failure patterns. In related art implementations, this monitoring process was done manually through visual inspection of equipment or using monitoring tools such as vibration monitoring and ultrasonic devices. With the advancement in operation and information technologies, most of the equipment are now instrumented with hundreds of sensors, and a lot of measurements are produced every fraction of a second. These measurements can contain valuable information about the status of the equipment and it can be used to detect early signs of failures before they happen.

SUMMARY

However, there are several challenges for related art failure prediction approaches. For many systems and components, there are not enough failure examples in the training data. Physical equipment and systems are engineered not to fail, and as a result failure data is rare and difficult to collect. Further, failure data is extremely costly to collect. For example, it is not feasible to collect failure data from operating aircraft engines. Further, complex physical systems have multiple failure and degradation modes, often depending upon varying operating conditions. Thus those data can have very complex patterns.

Example implementations described herein involve a system for maintenance recommendation based on data-driven failure prediction. In example implementations described herein, there is a system for failure prediction using GAN. Example implementations generate realistic samples for failure prediction using GAN, train an inference network using a second GAN and combine weighted loss with inference network with GAN training.

Example implementations involve several aspects as follows. In one aspect, realistic failure and non-failure samples are generated using a GAN network. In another aspect, the weighted loss objective is adopted to train inference network using real failure and non-failure samples. In example implementations described herein, this inference network shares the weights of the first few layers with the discriminator network of the GAN in first module. In another aspect, the inference network is further tuned using a second GAN by enforcing consistency between the output of the first GAN and label generated by the inference network.

Aspects of the present disclosure involve a method for training a predictive maintenance model, which can involve executing a first process configured to generate sample data from actual data and noise that is trained against a first loss function in comparison to the actual data; executing a second process configured to infer labels from the actual data that is trained against a second loss function in comparison to actual labels; executing a third process configured to generate labels for the generated sample data using a same network as the second process that is trained against a third loss function in comparison to the actual data and the actual labels; and generating the predictive maintenance model derived from a convergence of the first process, the second process, and the third process.

Aspects of the present disclosure involve a computer program for training a predictive maintenance model, which can involve instructions for executing a first process configured to generate sample data from actual data and noise that is trained against a first loss function in comparison to the actual data; executing a second process configured to infer labels from the actual data that is trained against a second loss function in comparison to actual labels; executing a third process configured to generate labels for the generated sample data using a same network as the second process that is trained against a third loss function in comparison to the actual data and the actual labels; and generating the predictive maintenance model derived from a convergence of the first process, the second process, and the third process.

Aspects of the present disclosure involve a system for training a predictive maintenance model, which can involve means for executing a first process configured to generate sample data from actual data and noise that is trained against a first loss function in comparison to the actual data; means for executing a second process configured to infer labels from the actual data that is trained against a second loss function in comparison to actual labels; means for executing a third process configured to generate labels for the generated sample data using a same network as the second process that is trained against a third loss function in comparison to the actual data and the actual labels; and means for generating the predictive maintenance model derived from a convergence of the first process, the second process, and the third process.

Aspects of the present disclosure involve an apparatus for training a predictive maintenance model, which can involve a process configured to execute instructions involving executing a first process configured to generate sample data from actual data and noise that is trained against a first loss function in comparison to the actual data; executing a second process configured to infer labels from the actual data that is trained against a second loss function in comparison to actual labels; executing a third process configured to generate labels for the generated sample data using a same network as the second process that is trained against a third loss function in comparison to the actual data and the actual labels; and generating the predictive maintenance model derived from a convergence of the first process, the second process, and the third process.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations. Throughout the disclosure, "real data" and "actual data" may be used interchangeably. Further, "generated data" and "sample data" may also be used interchangeably.

Oversampling has been used to create more training samples for failure prediction systems. However, oversampling cannot capture the complexity of the failure patterns and can introduce undesirable noise with overfitting risks due to the limitation of oversampling models. Generative Adversarial Networks (GAN) is used to generate realistic data samples in the related art implementations.

In a related art implementation, InfoGAN can be used to generate data with fine variations. InfoGAN decomposes the input noise vector into two parts: noise vector z and latent code vector c. The latent code vector c targets the salient structured semantic features of the data distribution and can be further divided into categorical and continuous latent code, where the categorical code controls sample labels and continuous code controls variations.

Figure 1:
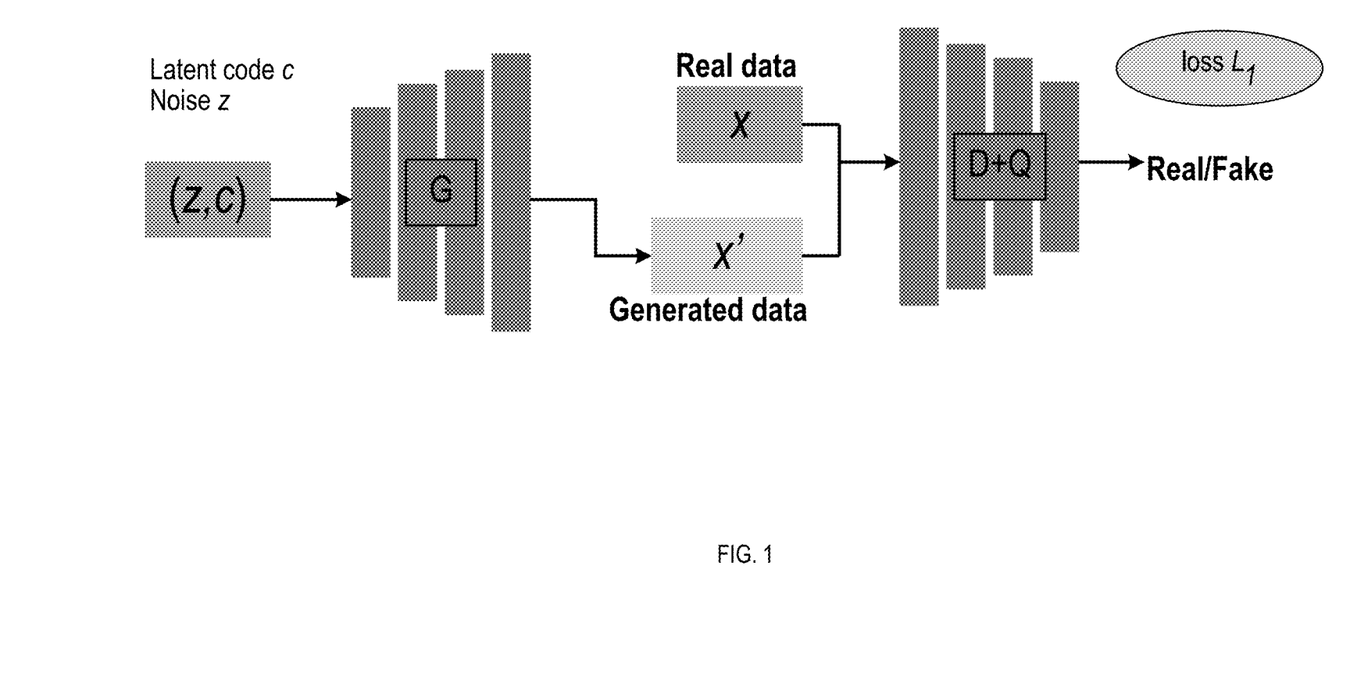
FIG. 1 illustrates the structure of infoGAN, which involves network G, D and Q.

FIG. 1 illustrates the structure of infoGAN, which involves network G, D and Q. Network G is a deep neural network with input (z,c), and outputs generated sample x', where x' has the same size as real data x. Network D aims to distinguish generated sample x' from real sample x. Network Q aims to maximize the mutual information between latent code c and generated sample x'. By jointly training network G, D and Q, infoGAN solves the minimax problem with respect to infoGAN loss function $L_1$. $L_1$ is the loss of infoGAN.

Figure 2:
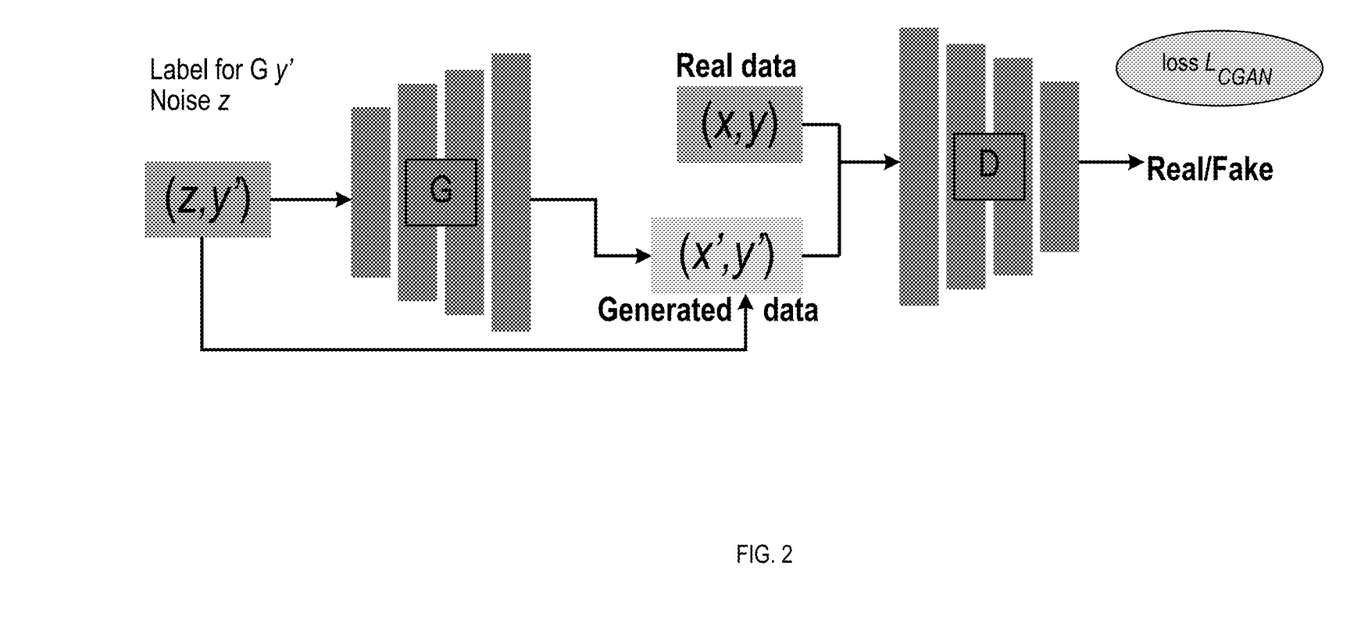
FIG. 2 illustrates an example architecture of CGAN.

Conditional GAN (CGAN) adds extra label information y' to generator G for conditional generation. In discriminator D, both x and y are presented as inputs and D tries to distinguish if data-label pair is from generated or real data. FIG. 2 illustrates an example architecture of CGAN.

In failure prediction problems, example implementations collect training data x and the corresponding labels y. Training data x is a vector, which can include sensor data coming from equipment, but can also be image, acoustic, and other data as well depending on the desired implementation. Label y contains many non-failure labels and very few failure labels.

Given a failure prediction problem, one choice is to construct a deep inference neural network and adopt a weighted loss objective. As there are not enough real failure samples, test samples with failure labels are often misclassified to the prevalent non-failure class. As mentioned earlier, example implementations use GANs to generate realistic failure samples.

Once such data is generated, a straightforward approach is to use both the generated and real samples to train a classifier. However, since there is a sharing of layers between the inference network and the discriminator network in the first GAN, and training across three modules simultaneously as is illustrated in FIG. 3, example implementations directly use this inference network to achieve higher inference accuracy.

Figure 3:
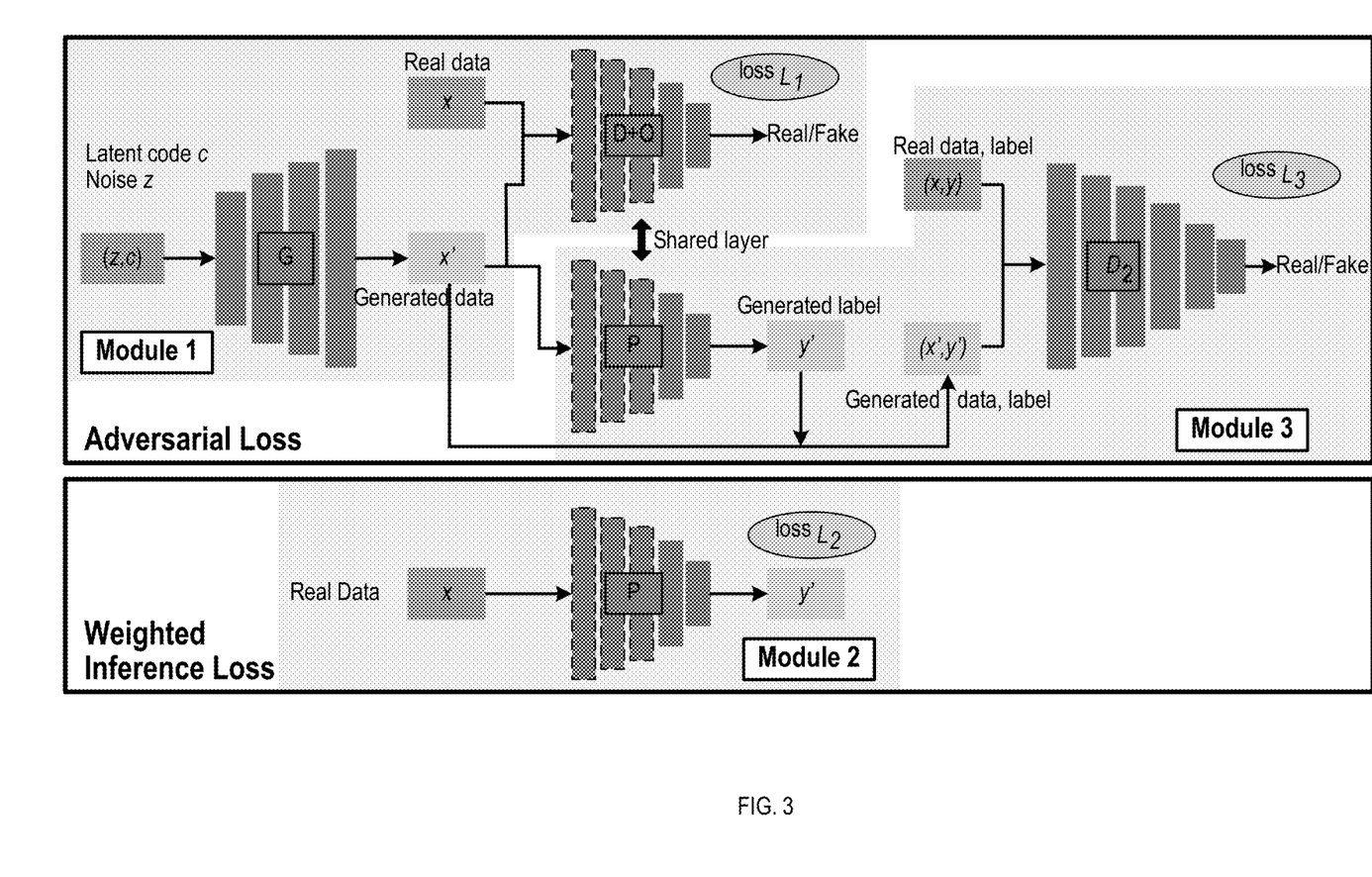
FIG. 3 illustrates a GAN based example implementation using three modules to construct failure prediction.

FIG. 3 illustrates a GAN based example implementation using three modules to construct failure prediction. Module 1 adopts a GAN to generate class-balanced sample, such as infoGAN. For the input categorical latent code c, example implementations randomly generate labels of 0s (non-failure) and 1s (failure) with equal probability. The continuous latent code c and noise vector z is generated using a uniform random process. Network G is a deep neural network with input (z,c), and outputs generated sample x', where x' has the same size as real data x. Network D aims to distinguish generated sample x' from real sample x. Network Q aims to maximize the mutual information between latent code c and generated sample x'. By jointly training networks G, D and Q, module 1 solves the minimax problem with respect to infoGAN loss function $L_1$. $L_1$ is the loss of the infoGAN. Further, Module 1 allows other variations of GANs as well in accordance with the desired implementation.

Module 2 involves a deep neural network P and solves a binary classification problem with weighted loss based on real data and real labels. Network P shares the first several layers with D and takes as input real data x and outputs a probability within range [0,1], indicating the chance that x is a failure sample. The loss function $L_2$ for module 2 is a weighted cross entropy. The weight of the failure class is larger than the weight of the non-failure class. Loss $L_2$ is a weighted version which emphasizes more on failure sample prediction.

Module 3 is GAN structure which involves network P and D2 and enforces a generated data-label pair (x', y') to resemble real data-label pair (x, y). P serves as the generator network. Given x', the generated label y'=P(x') needs to be as correct as possible. D2 tries to distinguish the generated data-label pair from real pair. Loss $L_3$ is a minimax objective for module 3, where generator loss is from network P and discriminator loss is from network D2.

Figure 4:
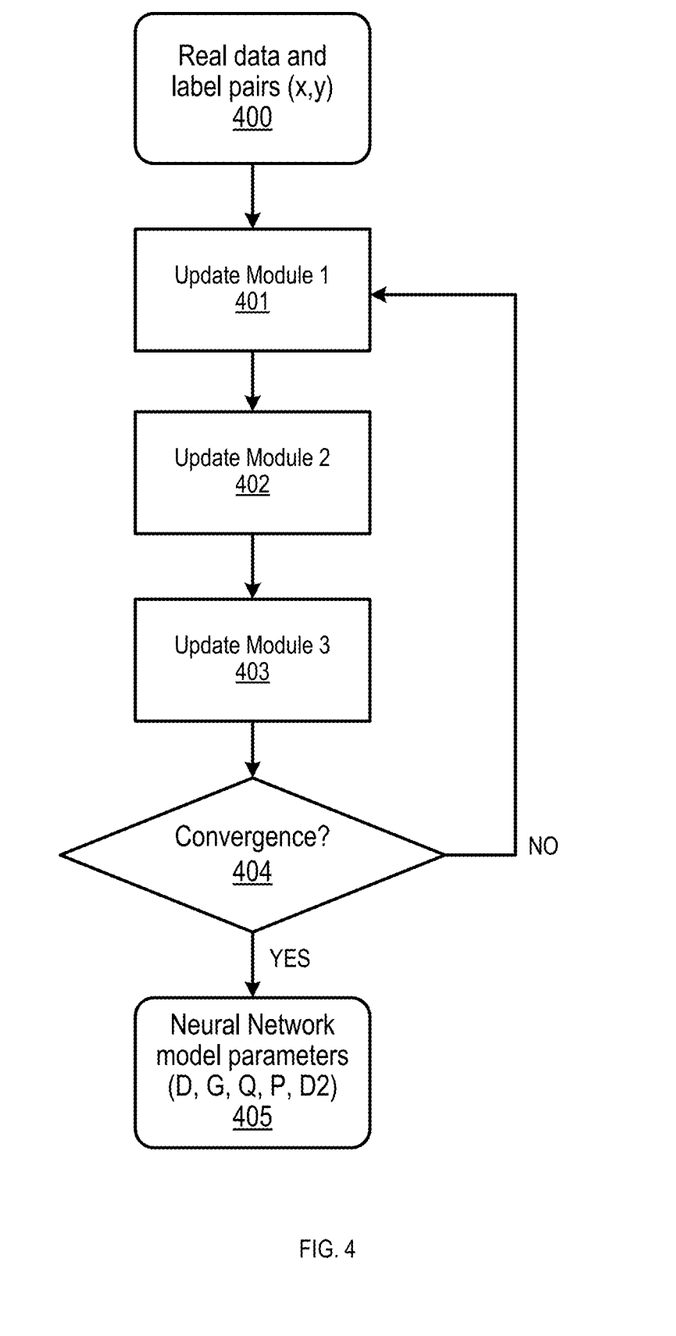
FIG. 4 illustrates an example flow diagram for training the design, in accordance with an example implementation.

FIG. 4 illustrates an example flow diagram for training the design, in accordance with an example implementation. Specifically, the flow diagram illustrates the flow for optimizing the structure of FIG. 1 using the structure as illustrated in FIG. 3.

As illustrated in FIG. 4, the input 400 to the flow involves real data and label pairs (x,y). The output of FIG. 4 is the Neural network model parameters (D, G, Q, P, D2) at 405.

The network in FIG. 1 is initialized, which serves as Module 1. Then, the following process is iterated until convergence.

At first, a batch of data and label pairs are randomly selected from real data. Then, latent code c and noise z are randomly generated, wherein c is class-balanced. The random selection and random generation can be conducted by any methods known to one of ordinary skill in the art.

At 401, the flow updates Module 1 based on the generation of data and label pairs, as well as the latent code c and noise z. To update Module 1, the flow updates network D in Module 1 and share the weights of the first few layers with network P. The update also includes updating G and Q in Module 1.

At 402, the flow updates Module 2, which involves updating P in Module 2 and using P as the generator of Module 3.

At 403, the flow updates Module 3, which involves updating network D2 in Module 3 and network P in Module 3.

At 404, a determination is made if convergence has occurred. If so (Yes), then the flow proceeds to 405 to provide the neural network parameter output. Otherwise (No), the flow proceeds back to 401 after reselecting the batch of data and label pairs from real data and randomly regenerating latent code c and noise z.

In the training phase, all networks in FIG. 3 are thereby updated and trained. In the application phase, only network P will be used. In the application phase, a user can thereby input an unknown sensor data x into network P, and P can thereby output the prediction label (e.g., failure or non-failure).

Further, depending on the desired implementation, Module 1 can be any other type of GAN, which can generate failure and non-failure samples in accordance with the desired implementation. Additionally, Module 2 can be any other binary classification neural network model. The weight of failure class loss can be changed to different values in accordance with a desired implementation.

The example implementations described herein can be used as a standalone solution or be integrated with existing systems that provide other functionalities for maintenance management and optimization.

Figure 5:
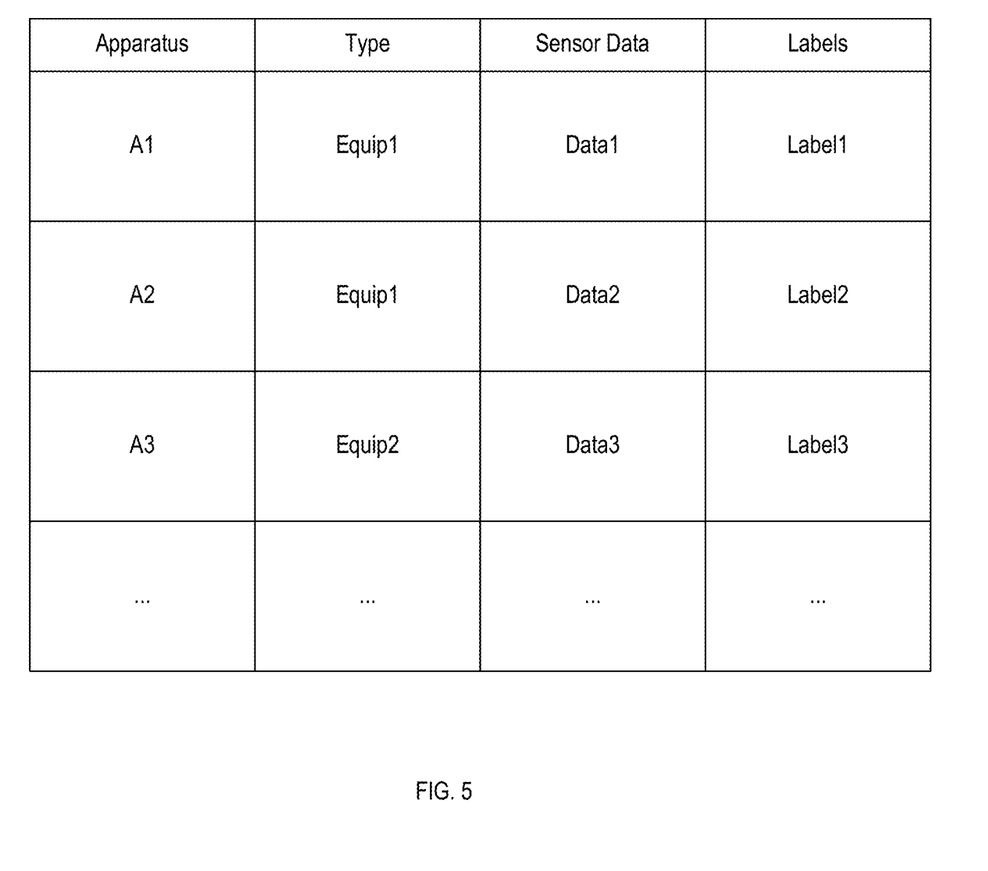
FIG. 5 illustrates example management information received from various apparatuses, in accordance with an example implementation.
Figure 6:
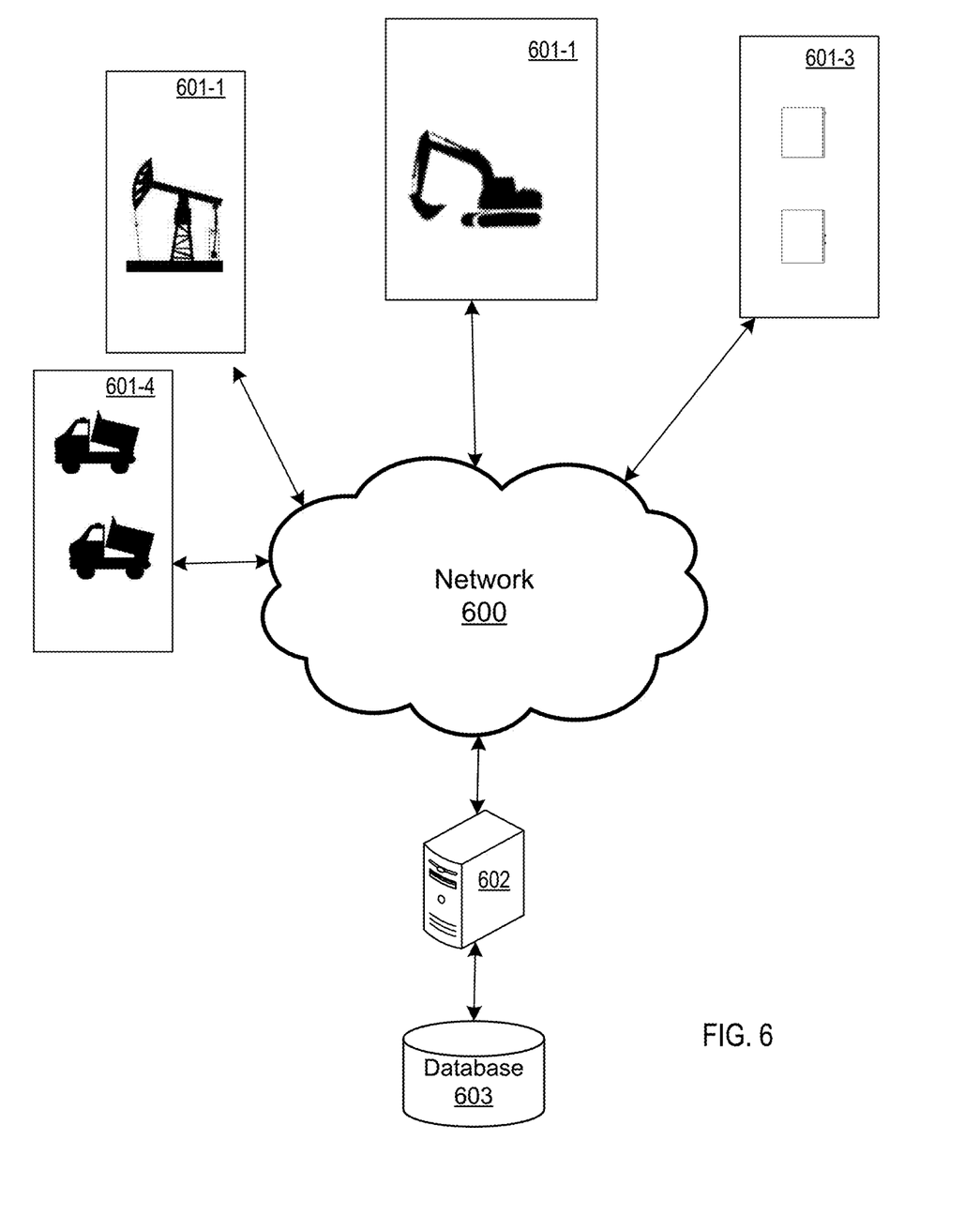
FIG. 6 illustrates a system involving a plurality of apparatuses and a management apparatus, in accordance with an example implementation.

FIG. 5 illustrates example management information received from various apparatuses, in accordance with an example implementation. Such management information can include the apparatus of the system, the type of apparatus, sensor data received from the apparatus, and corresponding labels on the sensor data. Apparatuses and types of apparatuses can be any kind in accordance with the desired implementation and as illustrated in FIG. 6. Sensor data can be in the form of time series data and can be streaming data or batch data in accordance with the desired implementation. Labels may also be in a similar format to the sensor data, in the form of associating the appropriate labels in a time series format.

FIG. 6 illustrates a system involving a plurality of apparatuses and a management apparatus, in accordance with an example implementation. One or more apparatuses or apparatus systems 601-1, 601-2, 601-3, and 601-4 are communicatively coupled to a network 600 which is connected to a management apparatus 602. The management apparatus 602 manages a database 603, which contains historical data collected from the apparatuses and apparatus systems in the network 600. In alternate example implementations, the data from the apparatuses and apparatus systems 601-1, 601-2, 601-3, and 601-4 can be stored to a central repository or central database such as proprietary databases that data from equipment or equipment systems such as enterprise resource planning systems, and the management apparatus 602 can access or retrieve the data from the central repository or central database. Such data can include the management information as illustrated in FIG. 5. Such apparatuses can include stationary apparatuses or equipment with sensor systems such as coolers, water tanks, air compressors, electrical lines, as well as mobile apparatuses or equipment such as moving robots, robotic arms, as well as any other apparatuses that are integrated into the industrial networks or any other apparatus that can operate as a component that can be part of an industrial network. The sensor data provided by the one or more apparatuses can involve data while the apparatuses were operating under the normal condition, and the sensor data when the apparatuses underwent a fault, the labels of which can be applied accordingly. For integration into training a machine learning classifier in accordance with the example implementations described herein, the sensor data may also be labeled to indicate if the sensor data incorporated from the component is when the component is operating in a normal condition or undergoing some sort of fault.

Example environments of FIG. 6 can include any predictive maintenance system, such as factories. In such environments, the example implementations can conduct failure prediction (predict failures ahead of time using sensor data), failure detection (monitor systems for failure events), failure isolation (identify the reasons and components of different type of failures), determining if a maintenance action achieved the target performance improvement, eliminating unnecessary maintenance actions thereby saving on parts and labor cost, discovering which maintenance types are unnecessary for a fleet of equipment, exploring which maintenance company/staff is providing the best service, discovering if maintenance is effective for old equipment and whether a replacement is more cost-effective, and so on.

Figure 7:
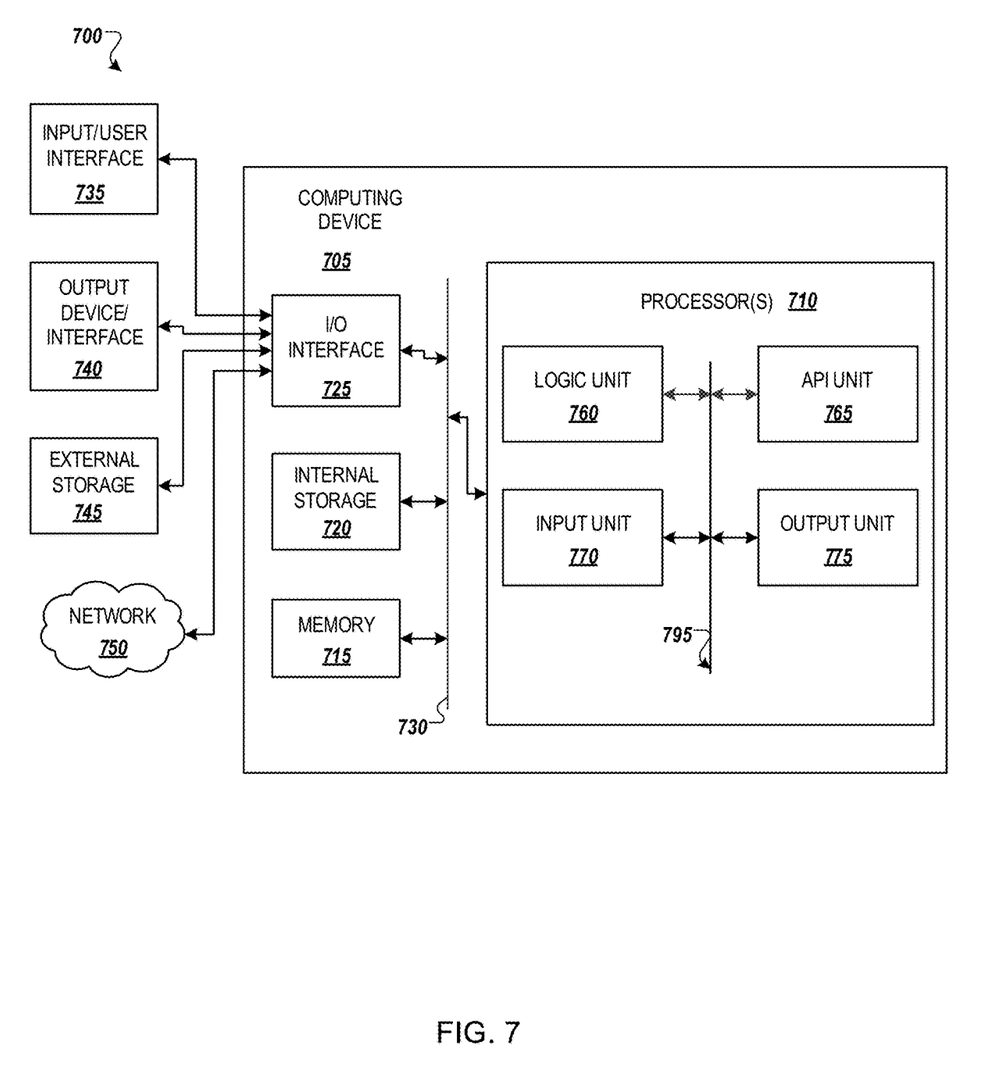
FIG. 7 illustrates an example computing environment with an example computer device suitable for use in some example implementations.

FIG. 7 illustrates an example computing environment with an example computer device suitable for use in some example implementations, such as a management apparatus 602 as illustrated in FIG. 6. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Processor(s) 710 can be configured to train a predictive maintenance model as constructed from neural network model parameters received from the output of the process of FIG. 4. In such example implementations, processor(s) 710 can be configured to execute a first process configured to generate sample data from actual data and noise that is trained against a first loss function in comparison to the actual data as illustrated by Module 1 in FIG. 1 and FIG. 3. Such example implementations would involve using the loss function $L_1$ as illustrated in FIG. 1 and FIG. 3, and sample data being generated as generated data x' from latent code c (as derived from actual data) and noise z.

Processor(s) 710 can execute a second process configured to infer labels from the actual data that is trained against a second loss function in comparison to actual labels as illustrated in Module 2 of FIG. 3, from being provided with real data x to generate labels y' in comparison to a loss function $L_2$. As shown, the first process can be configured to generate the sample data from a latent code vector, and a noise vector.

Processor(s) 710 is configured to execute a third process configured to generate labels for the generated sample data using a same network as the second process that is trained against a third loss function in comparison to the actual data and the actual labels as illustrated by Module 3 in FIG. 2 and FIG. 3. Such example implementations would involve using the loss function $L_3$ as illustrated in FIG. 2 and FIG. 3 and comparing the generated data x' and the generated label y' as a pair against the real data x and label y as stored in FIG. 5. As shown in FIG. 3, there can also be a shared layer between the parameters of Module 1 and Module 3 so that the modules can share the parameters of D, Q and P. Depending on the desired implementation, the first process and the third process can be GANs.

Processor(s) 710 can be configured to generate the predictive maintenance model (output as P) derived from a convergence of the first process, the second process, and the third process. In example implementations, convergence can occur when the loss $L_1$, $L_2$ and $L_3$ are minimized. The net result is that Module 2 is optimized with predictive maintenance model P to provide the appropriate label y' given real data x, even if the real data is from a new equipment or sensor. As Modules 1, 2, and 3 are trained together, the result of the example implementations described herein result in a more accurate predictive maintenance model than that of the related art. As shown in FIG. 4, the first process, the second process, and the third process are repeatedly iterated together until the convergence is reached.

In the example implementations, the predictive maintenance model can thereby be configured to provide one or more of failure prediction, failure isolation, and failure detection from an input of data. In such example implementations, such information can be provided in the labels or derived from the labels. For example, failure prediction can be in the form of estimated time period until failure. Failure isolation can be in the form of identifying the type of failure based on the label and the type of data received. Failure detection can be in the form of a label indicating either the occurrence of a failure or that the equipment is operating under normal conditions.

Example implementations thereby improve upon the related art by training the predictive maintenance model using machine learning techniques such as GAN to train against data-label pairs through the three module network iteratively and concurrently, thereby resulting in a more accurate model than training a predictive maintenance model from data alone.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for training a predictive maintenance model, comprising:
executing a first process configured to generate sample data from real time sensor data and noise that is trained against a first loss function in comparison to the real time sensor data;

executing a second process configured to generate labels from the real time sensor data that is trained against a second loss function in comparison to actual labels;

executing a third process configured to generate labels for the generated sample data using a same network as the second process that is trained against a third loss function in comparison to the real time sensor data and the actual labels;

generating the predictive maintenance model derived from a convergence of the first process, the second process, and the third process; and performing predictive maintenance based on the generated predictive maintenance model.

2. The method of claim 1, further comprising applying a shared layer between parameters of the first process and the second process.

3. The method of claim 1, wherein the first process and the third process are general adversarial networks (GAN).

4. The method of claim 1, wherein the first process, the second process, and the third process are repeatedly iterated together until the convergence is reached.

5. The method of claim 4, wherein the convergence is determined from minimizing the first loss function, the second loss function, and the third loss function.

6. The method of claim 1, wherein the first process is configured to generate the sample data from a latent code vector and a noise vector.

7. The method of claim 1, wherein the predictive maintenance model is configured to provide one or more of failure prediction, failure isolation, and failure detection from an input of data.

8. A non-transitory computer readable medium storing instructions for training a predictive maintenance model, the instructions comprising:

executing a first process configured to generate sample data from real time sensor data and noise that is trained against a first loss function in comparison to the real time sensor data;

executing a second process configured to generate labels from the real time sensor data that is trained against a second loss function in comparison to actual labels;

executing a third process configured to generate labels for the generated sample data using a same network as the second process that is trained against a third loss function in comparison to the real time sensor data and the actual labels;

generating the predictive maintenance model derived from a convergence of the first process, the second process, and the third process; and performing predictive maintenance based on the generated predictive maintenance model.

9. The non-transitory computer readable medium of claim 8, further comprising applying a shared layer between parameters of the first process and the second process.

10. The non-transitory computer readable medium of claim 8, wherein the first process and the third process are general adversarial networks (GAN).

11. The non-transitory computer readable medium of claim 8, wherein the first process, the second process, and the third process are repeatedly iterated together until the convergence is reached.

12. The non-transitory computer readable medium of claim 11, wherein the convergence is determined from minimizing the first loss function, the second loss function, and the third loss function.

13. The non-transitory computer readable medium of claim 8, wherein the first process is configured to generate the sample data from a latent code vector, and a noise vector.

14. The non-transitory computer readable medium of claim 8, wherein the predictive maintenance model is configured to provide one or more of failure prediction, failure isolation, and failure detection from an input of data.

* * * * *